United States Patent [19]

Kostelnicek et al.

[11] Patent Number: 4,879,696

[45] Date of Patent: * Nov. 7, 1989

[54] METHOD AND APPARATUS FOR INITIATING SEISMIC DATA STORAGE IN AN ISOLATED DISTRIBUTED RECORDING SYSTEM

[75] Inventors: Richard J. Kostelnicek, Dickinson; Raul R. Montes, Houston, both of Tex.

[73] Assignee: Exxon Production Research Company, Houston, Tex.

[*] Notice: The portion of the term of this patent subsequent to Feb. 21, 2006 has been disclaimed.

[21] Appl. No.: 845,156

[22] Filed: Mar. 27, 1986

[51] Int. Cl.$^4$ .............................................. G01V 1/22
[52] U.S. Cl. .................................... 367/76; 346/33 C
[58] Field of Search ...................... 367/36, 37, 76–80;
455/40, 49, 51, 66, 68, 70; 340/870.07, 870.14,
870.28, 870.41, 870.3; 328/72; 346/33 C

[56] References Cited

U.S. PATENT DOCUMENTS

| | | | |
|---|---|---|---|
| 3,062,315 | 11/1962 | Herzog | 367/77 |
| 3,075,607 | 1/1963 | Aitken et al. | 367/77 |
| 3,283,295 | 11/1966 | Montgomery | 367/77 |
| 3,288,242 | 11/1966 | Loeb | 367/77 |
| 3,733,584 | 5/1973 | Pelton et al. | 367/77 |
| 3,742,440 | 6/1973 | Ehrlich et al. | 367/137 |
| 3,806,864 | 4/1974 | Broding | 367/77 |
| 3,886,494 | 5/1975 | Kostelnicek et al. | 367/77 |
| 3,914,732 | 10/1975 | Brumleve et al. | 367/197 |
| 3,916,371 | 10/1975 | Broding | 367/80 |
| 3,946,357 | 3/1976 | Weinstein et al. | 367/77 |
| 3,972,019 | 7/1976 | Bassett | 367/77 |
| 3,987,406 | 10/1976 | Broding | 367/80 |
| 4,010,442 | 3/1977 | Broding | 367/80 |
| 4,042,906 | 8/1977 | Ezell | 367/77 |
| 4,147,222 | 4/1979 | Patten et al. | 367/133 |
| 4,227,198 | 10/1980 | Preskitt et al. | 367/68 |
| 4,281,403 | 7/1981 | Siems et al. | 367/76 |
| 4,601,022 | 7/1986 | Muir | 367/14 |
| 4,639,901 | 1/1987 | Warmack et al. | 367/77 X |

FOREIGN PATENT DOCUMENTS 0042165 4/1981 Japan .................................... 367/77

OTHER PUBLICATIONS

William A. Prothero, "A Portable Digital Seismic Recorder with Event Recording Capability", Seismological Society Bulletin, vol. 66, No. 3, pp. 979–985, Jun. 1976.

Primary Examiner—Brian S. Steinberger
Attorney, Agent, or Firm—Raul R. Montes

[57] ABSTRACT

An improved method and apparatus for initiating seismic data storage in an Isolated Distributed Recording System. An encoded acoustic signal is generated by an acoustic energy source which is detected at an isolated distributed recorder where it is correlated with a preselected correlating signal. Upon sufficient correlation between the encoded acoustic signal and the preselected correlating signal, seismic data are stored. In the preferred embodiment, the invention relates to a method and apparatus for generating an encoded seismic signal utilizing a seismic energy source. The encoded seismic signal is correlated with a preselected correlating signal at an isolated distributed recorder; upon sufficient correlation between said signals, the isolated distributed recorder is triggered to store incoming seismic data commencing at the time the seismic data were generated and extending for a predetermined time interval. The time of arrival of all the seismic data stored is time-referenced to the time the seismic data were generated by the acoustic energy source for purposes of obtaining information about the sub-surface geological environment.

35 Claims, 2 Drawing Sheets

METHOD AND APPARATUS FOR INITIATING SEISMIC DATA STORAGE IN AN ISOLATED DISTRIBUTED RECORDING SYSTEM

FIELD OF INVENTION

The invention relates to a method and apparatus for initiating seismic data storage in an Isolated Distributed Recording System. More particularly, the invention relates to a method and apparatus for generating an encoded acoustic signal utilizing an acoustic energy source, detecting the encoded acoustic signal at an isolated distributed recorder, correlating said encoded acoustic signal with a preselected correlating said encoded acoustic signal with a preselected correlating signal, upon sufficient correlation between said signals, storing incoming seismic data commencing at the time the seismic data were generated and extending for a predetermined time interval, and referencing the time of arrival of all the seismic data recorded to the time the seismic data were generated.

BACKGROUND OF THE INVENTION

The recording of seismic signals generated during seismic exploration activities has traditionally required the sesimic data from remote sensor to be transmitted over miles of interconnecting cables to a centralized recording system. This method of performing a seismic survey is severely limited in areas of rugged terrain: mountainous regions, jungles, and anywhere surface obstructions make the cable interconnections difficult and impractical. Furthermore, in most seismic recording systems it is desirable to utilize multichannel recording equipment in which each channel consists of a multigeophone array. A multigeophone array is a grouping of individual geophones connected along a cable. Most seismic data are recorded from groups of multigeophone arrays, rather than single geophones or arrays. There are usually twenty-four, forty-eight, or ninety-six groups on a cable. Each group puts one sequence of electrical signals into the cable. The signals go through individual wires in the cable to the recording/processing instruments. Spreads composed of multigeophone arrays increase the complexity and cost of the cables and the frequency of their repair and maintenance.

Advances in instrumentation have made it possible to distribute portions of the data processing and data recording functions to wireless ("isolated") recording stations ("isolatted distributed recorders"). These "Isolated Distributed Recording Systems" eliminate the need for complex cable interconnections and provide greater flexibility in field operations.

In place of the communications link provided by an interconnecting cable system, Isolated Distributed Recording System generally utilize a Radio-Telemetry System or a Time Synchronization System. These systems may be briefly described as follows:

Radio-Telemetry Systems utilize a coded radio command to activate the isolated distributed recorders. To synchrozine the seismic data recording function and the seismic signal transmitting function, one with the other, timing pulses may also be radio-transmitted to the isolated distributed recording units. Once recorded, the seismic data may be played via radio to a central recorder station for permanent storage. Alternatively, the data may be recorded at the isolated distributed recorder. The data may be stored within the lithographed microcircuitry of a silicon chip, or a magnetic disc or tape may be used as the storage medium at the isolated distributed recorder. Once recorded, the seismic data can be retrieved from each isolated distributed recorder and played back at the central recorder station.

Representative Radio-Telemetry Systems are disclosed in Herzog U.S. Pat. No: 3,062,315; Aitken U.S. Pat. No. 3,075,607 et. al.; Montogomery U.S. Pat. No. 3,283,295; Lobe U.S. Pat. No. 3,288,242; Broding U.S. Pat. Nos. 3,506,864, 3,987,406, and 4,010,442; Kostelnicek U.S. Pat. No. 3,886,494; Winstein U.S. Pat. No. 3,946,357; and Ezell U.S. Pat. No. 4,042,906.

Time Synchronizations Systems, on the other hand, utilize an accurate time reference and a pre-selected time recording logic to operate the isolated distributed recorders independently of the central control station. Representative Time Synchronization System are disclosed in Siems U.S. Pat. Nos. 4,281,403,et al; Bassett U.S. Pat. No. 3,972,019; and Pelton U.S. Pat. No. 3,733,584, et al.

The pre-selected time recording logic eliminates radio transmissions of data between each isolated unit and the central control station. Recording of seismic data at each isolated distributed recorder is either continuous, usually for one day while a seismic survey is being "shot", or the recording of seismic data is effected in accordance with a pre-selected time logic at selected time periods regardless of whether seismic signals are being generated.

Although Radio-Telemetry Systems and Time Synchronization Systems represent a substantial contribution to the art of geophysical prospecting, these systems do suffer from certain disadvantages.

Radio-Telemetry Systems, for example, suffer from difficulties in reliably receiving the radio frequencies that are usually allocated to this type of service. To a large extent this has resulted from the difficulties inherent in separating the individual radio waves emanating from each separating the individual radio waves emanating from each geophone station and separately amplifying them without serious "cross-talk" or distortion. Cross-talk occurs when a portion of one signal mixes with or overlays another signal. This difficulty is accentuated by the fact that each individual distributed recorder or groups of recorders in a seismic plan are usually addressed by a different encoded radio command thereby increasing the difficulties and complications associated with the use of Radio-Telemetry Systems. Also, radio-controlled systems may use radio frequencies that are effective only along line-of-sight, and, therefore, such systems are often not effective in mountainous or obstructed terrains. Finally, in some areas, it is difficult, if not impossible, to obtain permits for use of radio transmissions, and Radio-Telemetry Systems cannot be employed.

A disadvantage of Time Synchronization Systems lies in the separation of the recording function and the seismic signal transmitting function. Said functions are independent of each other. In a Time Synchronization System the recording periods are preselected. Transmission of the seismic signal must coincide in time with the preselected recording period for any successful data gathering. Storage capacity is usually wasted during inactive shooting periods. Therefore, larger than required storage capacity at each isolated unit is usually required. Furthermore, flexibility of field operations is dependent on a pre-selected time recording logic which means that a signal must be transmitted while the recorder is in operation or such signal will not be recorded.

There exists a need, therefore, for a method and an apparatus to initiate recording at isolated distributed recorders in an Isolated Distributed Recording System which does not require radio transmissions or complete dependency on a pre-selected recording time logic to control the recording of seismic data during seismic exploration activities. It is also desired that recording of seismic data in an isolated distributed recorder occur only during periods of active "shooting" and not at any other time.

SUMMARY OF THE INVENTION

The invention relates to a method and an apparatus having a special application in the field of seismic exploration. The invention describes a method and an apparatus for transmitting an encoded acoustic signal utilizing an acoustic energy source, detecting the encoded acoustic signal at an isolated distributed recorder, correlating said encoded signal with a preselected correlating signal, and upon sufficient correlation between said signals, storing seismic data. It is also an object of this invention to reference the time of arrival of all seismic data recorded to the time the seismic data were generated.

It is a further object of this invention to provide a means for activating an isolated recording unit in an Isolated Distributed Recording System to commence storing seismic data during active seismic exploration and not at any other time.

It is a further object of this invention to record the encoded signal which activated the isolated distributed recorder in an Isolated Distributed Recording System and to store all incoming seismic data, commencing at the time the seismic data were generated and extending for a predetermined time interval, for purposes of obtaining information about the sub-surface geological environment by referencing the time of arrival of the stored data to the time said stored data were generated by an acoustic energy source.

It is a further object of this invention to provide a means to terminate the recording of seismic data at an isolated distributed recorder in an Isolated Distributed Recording System when no "useful" seismic information is being transmitted.

It is a further object of this invention to provide a system for initiating recording of seismic events by an Isolated Distributed Recording System which is responsive to an encoded signal generated by an acoustic energy source during seismic exploration operations.

BRIEF DESCRIPTION OF THE DRAWINGS

The invention is illustrated in the accompanying drawings wherein.

DESCRIPTION OF THE PREFERRED EMBODIMENT

Figure 1:
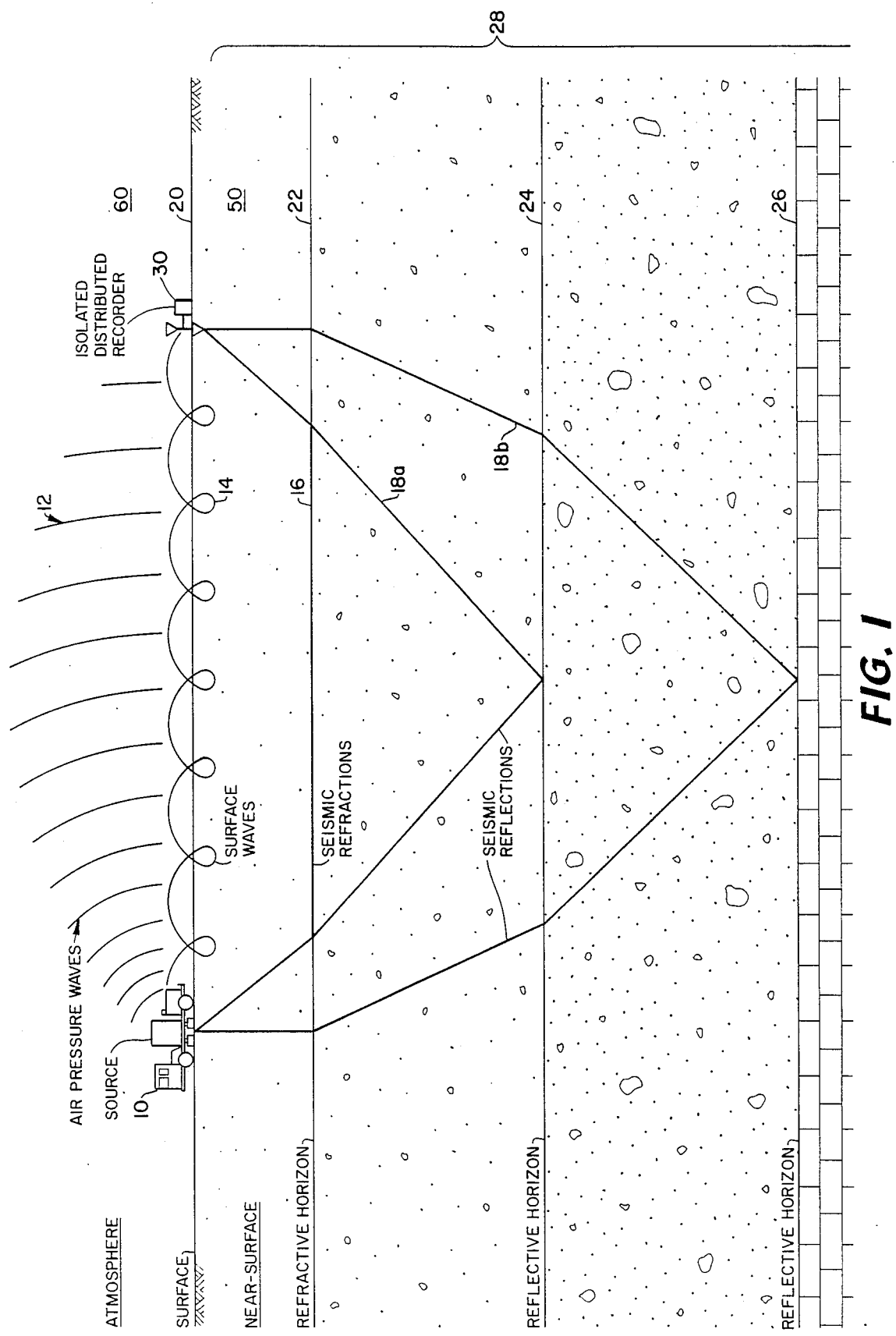
FIG. 1 is a schemtic diagram showning the preferred embodiment of the apparatus of the invention.

The invention will now be described with reference to the accompanying drawings. FIG. 1 schematically illustrates an Isolated Distributed Recording System for conducting seismic exploration operations. An acoustic energy source, figuratively shown in FIG. 1 as a seismic vibrator 10, is utilized to generate an encoded acoustic signal in a manner well known in the art. The encoding may be a unique sequence of frequencies, pulses or other time-coded sequential events. The encoding may also be effected by controlling the amplitude of a particular signal. Preferably, the signal is of such a nature that it would be very unlikely that it would occur from any other source, either natural or man-made. Encoding techniques are not new and have been employed in such areas as radar for distinguishing the "useful" signals from the presence of noise.

When seismic vibrator 10 is activated to generate an encoded acoustic signal in a particular field application, various other encoded acoustic waves or "waveforms" are also simultaneously created. The various waveforms created when seismic vibrator 10 is activated are illustrated in FIG. 1. Such waveforms are: air pressure waves 12, which propagate in atmosphere 60; surface waves 14, which travel through the earth's near-surface 50; seismic refractions 16 which travel along a refractive horizon 22 in a subterranean formation for some distance and then return to the surface; and seismic reflections 18a and 18b which propagate into (subterranean earth formations 28) and are reflected from one or more sub-surface reflecting horizons 24 or 26. Although created simultaneously, these different waveforms may not arrive at the same time at isolated distributed recorder 30. The velocity of propogation of each waveform depends on the medium's physical state (solid, liquid or gas), and, to a lesser extent, on the temperature and pressure of the substance. Each of these waveforms, however, contain the identical code information imparted by energy source 10, and the encoded signal can be processed regardless of whether the first event to arrive at the isolated distributed recorder is: an air pressure wave, a surface wave, a seismic refraction, or a seismic reflection.

Figure 2:
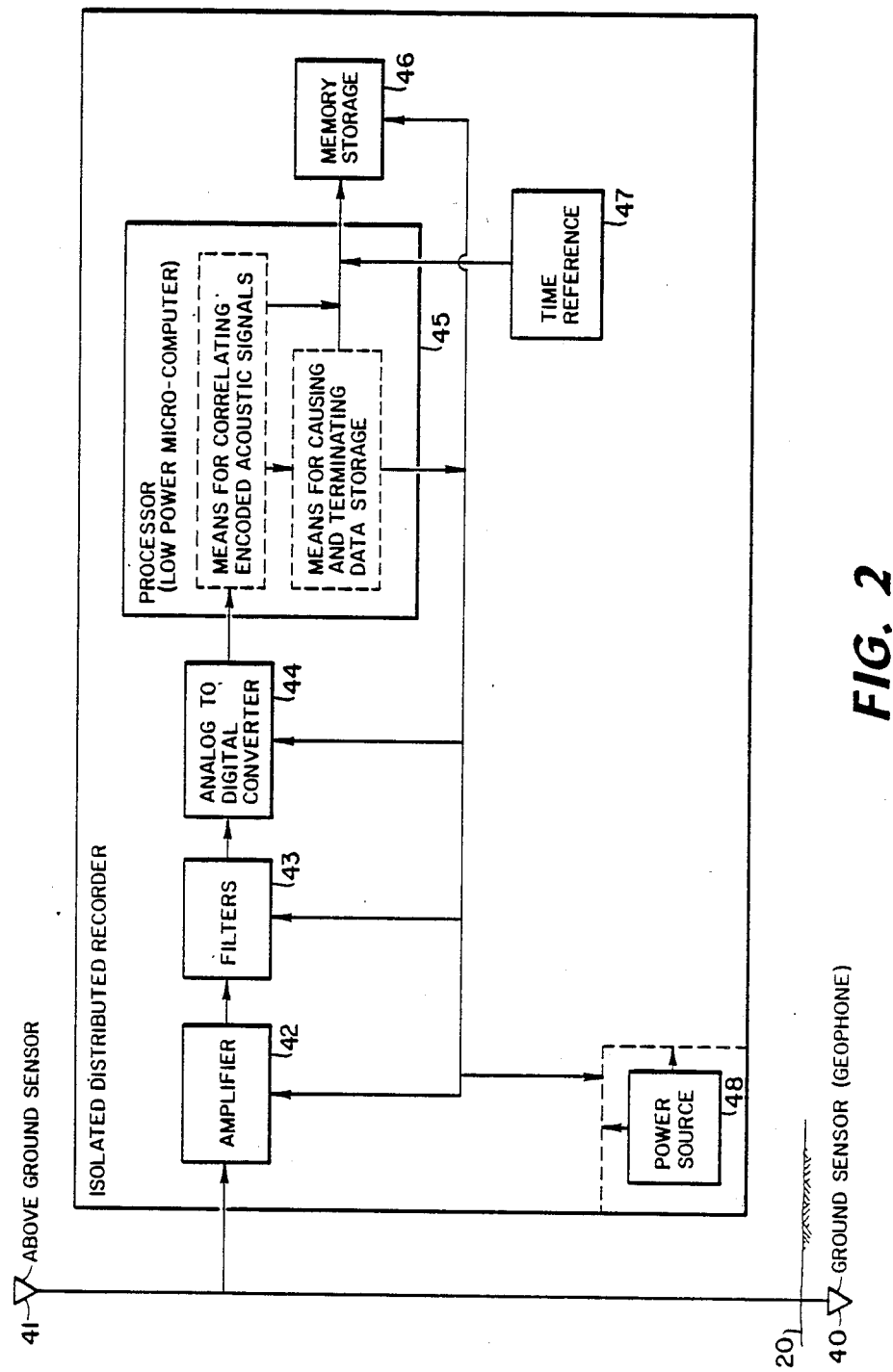
FIG. 2 is a block diagram of an isolated distributed recorder in accordance with the present invention.

Encoded signals received at the isolated distributed recorder 30 are continuously correlated with a stored preselected correlating waveform. Modern microcomputer techniques make this correlation practical. When an encoded acoustic signal shows sufficient correlation with the preselected waveform the recording system is activated to store incoming seismic data. Data storage may commence at the time the seismic data were generated by an acoustic energy source and continue, preferably for some predetermined time, until signals associated with all significant transmitted seismic data are stored. Significant transmitted seismic data includes all seismic information and data associated with the generation of an encoded acuostic signal by an acoustic or "seismic" energy source which is received at an isolated distributed recorder. The isolated distributed recorder then returns to a low power surveillance or power "conservation" mode awaiting another encoded starting sequence. With reference to FIG. 2, power supply 48, which may be a battery, supplies the needed energy for the above operations. The energy required from power source 48 is efficiently used since storage of seismic data occurs only at times of active seismic exploration. The data recorded are time-referenced so that the data can later be processed with corresponding data from other isolated distributed recorders in the Distributed Recorder System as is generally done in seismic data processing and intepretation. Power source 48 also supplies the energy required for this function.

Also with reference to FIG. 2, encoded signal 12, 14, 16 18a, or 18b is received by sensors 40 or 41, then passes to amplifier 42 where the signal is amplified for better processing. The amplified signal may be sent through frequency filters 43. Frequencies which are considered to contain no relevant information are thereby filtered and disregarded. The filtered encoded signal is sent to analog-to-digital converter 44 where the signal is converted from a coded analog signal to digital data. The digitized data are then sent to processor 45. Processor 45 can be a low power microcomputer. The digitized encoded signal is correlated in processor 45 with a preselected stored correlating signal and, upon sufficient correlation, processor 45 sends the encoded signal and all seismsic data and information associated with the generation of such signal to memory storage 46. Correlation of an encoded signal and a preselected stored signal may also be accomplished, for example, by means of conventional electronic circuitry or a shift registry device, both of which are well known in the art. Storage of significant seismic data received prior to the occurrence of the triggering signal may be accomplished by utilizing time-delay electrical circuitry, which places the significant seismic data in temporary storage while the correlation function is taking place in parallel electrical circuitry prior to storage. The same function may be also accomplished by placing the encoded signal, including all seismic information associated with the generation of the encoded signal, in the temporary storage of microcomputer circuitry during correlation of the signals. Isolated distributed recorder 30 may also contain time reference 47, which may be a clock, in order to identify the time of arrival of the seismic data which are recorded in memory 46. By way of explanation, and not by way of limitation, a Time Synchronization System may be employed for accurately referencing the time of arrival at the isolated distributed recorder of the encoded signal, or all seismic data and information associated with the generation of the encoded signal, to the time said encoded signal or seismic data and information were generated by the acoustic energy source. Generally, such a system would include an accurate clock or other similar timing device at the central station, and each isolated distributed recorder would also have an equally accurate timing device or "local" clock in relationship with the timing device at the central station. Usually, the local clocks are synchronized with the clock at the central station prior to the initiation of active seismic exploration activities. As an example, one such Time Synchronization System, suitable for use in the preferred embodiment of the present invention, is disclosed in Simes U.S. Pat. 4,281,403, et al., which is incorporated herein by reference thereto.

A suitable encoded acoustic signal may be generated by any of various acoustic or seismic energy sources generally utilized for seismic exploration. These seismic energy sources can generally be classified as being one of two basic types.

The first type of seismic energy source can generally be described as being impulsive in nature, that is, of short time duration. Impulsive acoustic energy sources can be further subdivided into those that are explosive and those that are implosive in nature. An example of an explosive energy source is dynamite detonated in a hole in the ground or an explosive cord. Explosives may be fired individually or in a time sequential pattern depending on a particular field application of the present invention. A combustible gas exploded in a chamber pressed to the ground is another example of an explosive energy source. The steam gun, used in marine work, is an example of an implosive energy source.

The second type of seismic energy source is one which is characterized by the ability to generate acoustic signals which are relatively long in duration. An example of such a source is one that imparts a controlled vibration to the earth, such as seismic vibrator 10 illustrated in FIG. 1. A seismic vibrator goes through a sweep of frequencies in the course of what is normally 4-15 seconds. During processing, this long duration signal is compressed in time, such that subsequent processing proceeds as though a single shot has been fired.

Changes and modifications to the specifically described embodiment can be carried out without departing from the scope of the invention, which is intended to be limited only by the scope of the appended claims.

We claim:

1. A method for initiating seismic data storage in an Isolated Distributed Recording System, including the steps of:
   (a) generating an encoded seismic signal, utilizing an acoustic energy source, which will penetrate to a sub-surface refractive horizon;
   (b) detecting a refraction of said controlled seismic signal from the refractive horizon with at least one isolated distributed recorder;
   (c) correlating said refracted seismic signal with a preselected correlating signal; and
   (d) upon correlation between said correlating signal and said refracted seismic signal, triggering the isolated distributed recorder to store incoming seismic data.

2. The method of claim 1, further including the step fo:
   (e) storing said refracted seismic signal and said incoming seismic data.

3. A method for initiating seismic data storage in an Isolated Distributed Recording System, including the steps of:
   (a) generating an encoded seismic signal, utilizing an acoustic energy source, which will penetrate to a sub-surface reflective horizon;
   (b) detecting a reflection of said encoded seismic signal from the sub-surface reflective horzion with at least one isolated distributed recorder;
   (c) correlating said reflected seismic signal with a preselected correlating signal; and pl (d) upon correlation between said correlating signal and said reflected seismic signal, triggering the isolated distributed recorder to store incoming seismic data.

4. The method of claim 3, further including the step of:
   (e) storing said reflected seismic signal and said incoming seismic data.

5. The method of claims 2, or 4, further including the step of:
   (f) referencing the time of arrival at said isolated distributed recorder of said incoming seismic data to the time said incoming seismic data were generated by said acoustic energy source.

6. The method of claims 1, 2, 3, or 4, further including the step of:
   terminating the storing of incoming seismic data after a predetermined time interval has elaspsed from the time said isolated distributed recorder was triggered into operation.

7. The method of claims 1 or 3 wherein said encoded seismic signal is generated by at least one seismic vibrator.

8. The method of claims 1 or 3 wherein said encoded seismic signal is generated by at least one impulsive acoustic energy source.

9. The method of claims 1 or 3 wherein said encoded seismic signal is generated by at least one controlled-vibration acoustic energy source.

10. A method for initiating seismic data storage in an Isolated Distributed Recording System, including the steps of:
   (a) generating an encoded acoustic signal utilizing an acoustic energy source;
   (b) detecting said encoded acoustic signal with at least one isolated distributed recorder;
   (c) correlating said encoded acoustic signal with a preselected correlating signal;
   (d) upon correlation between said correlating signal and said encoded acoustic signal, triggering the isolated distributed recorder to store said encoded acoustic signal and incoming seismic data including waveforms detected by said at least one isolated distributed recorder which were generated by said acoustic energy source at the time said encoded acoustic signal was generated; and
   (e) referencing the time of arrival at said isolated distributed recorder of said encoded acoustic signal and said incoming seismic data, including said waveforms, to the time said encoded acustic signal and said incoming seismic data and waveforms were generated by said acoustic energy source.

11. The method of claim 10, wherein said encoded acoustic signal is an encoded seismic signal.

12. The method of claim 10 wherein said acoustic energy source is an impulsive acoustic energy source.

13. The method of claim 10 wherein said acoustic energy source is one that imparts a controlled vibration to the earth.

14. A method fo initiating seismic data storage in an Isolated Distributed Recording System, including the steps of:
   (a) generating an encoded seismic signal, utilizing an acoustic energy source, which will penetrate to a sub-surface refractive horizon;
   (b) detecting a refraction of said encoded seismic signal from the sub-surface refractive horizon with at least one isolated distributed recorder;
   (c) correlating said refracted seismic signal with a preselected correlating signal;
   (d) upon correlation between said correlating signal and said refracted seismic signal, triggering the isolated distributed recorder to store said refracted seismic signal and incoming seismic data including waveforms detected by said at least one isolated distributed recorder which were generated by said acoustic engergy source at the time seismic information associated with the generation said encoded seismid signal was generated; and
   (e) referencing the time of arrival at said isolated distributed recorder of said refracted seismic signal and said incomimng seismic data, including said waveforms, to the time said encoded seismic signal and said incoming seismic data and waveforms were generated by said acoustic energy source.

15. A method for initiating seismic data storage in an Isolated Distributed Recording System, including the steps of:
   (a) generating an encoded seismic signal, utilizing an acoustic energy source, which will penetrate to a sub-surface reflective horizon;
   (b) detecting a reflection of said encoded seismic signal from the sub-surface reflective horizon with at least one isolated distributed recorder;
   (c) correlating said reflected seismic signal with a preselected correlating signal;
   (d) upon correlation between said correlating signal and said reflected seismic signal, triggering the isolated distributed recorder to store said reflected seismic signal and incoming seismic data including waveforms detected by said at least one isolated distributed recorder which were generated by said acoustic energy source at the time said encoded seismic signal was generated; and
   (e) referencing the time of arrival at said isolated distributed recorder of said reflected seismic signal and incoming seismic data, including said waveforms, to the time said encoded seismic signal and said incoming seismic data and waveforms were generated by said acoustic energy source.

16. The method of claim 10, 11, 12, 13, 14, or 15, further including the step of:
   (f) terminating the storing of incoming seismic data after a predetermined time interval has elapsed from the time said isolated distributed recorder was triggered into operation.

17. The method of claim 14 or 15 wherein said encoded seismic signal is generated by at least one seismic vibrator.

18. The method of claim 14 or 15 wherein said encoded seismic signal is generated by at least one impulsive acoustic energy source.

19. The method claim 14 or 15 wherein said encoded seismic signal is generated by at least one controlled-vibration acoustic energy source.

20. A system for initiating data storage at an isolated distributed recorder, including:
   (a) a source of an encoded seismic signal capable of penetrating to and refracting from a sub-surface refractive horizon; and
   (b) an isolated distributed recorder for detecting a refraction of said encoded seismic signal, said isolated distributed recorder including:
   means for correlating said refracted seismic signal with a preselected correlating signal; and
   means for causing said isolated distributed recorder to store incoming seismic data upon correlation between said correlating signal and said refracted seismic signal.

21. The system of claim 20 wherein said isolated distributed recorder further includes:
   means for storing said refracted seismic signal and said incoming seismic data.

22. A system for initiating data storage at an isolated distributed recorder, including:
   (a) a source of an encoded seismic signal capable of penetrating to and reflecting from a sub-surface reflective horizon; and
   (b) an isolated distributed recorder for detecting a reflection of said encoded seismic signal, said isolated distributed recorder including:
   means for correlating said reflected seismic signal with a preselected correlating signal; and
   means for causing said isolated distributed recorder to store incoming seismic data upon correlation between said correlating signal and said reflected seismic signal.

23. The system of claim 22 wherein said isolated distributed recorder further includes:
means for storing said reflected seismic signal and said incoming seismic data.

24. The system of claims 20, 21, 22, or 31 wherein said isolated distributed recorder further includes:
means for referencing the time of arrival at said isolated distributed recorder of said incoming seismic data to the time said seismic data were generated by said source.

25. The system of claims 20, 21, 22, or 23 wherein said isolated distributed recorder further includes:
means of terminating the storing of incoming seismic data after a predetermined time interval has elapsed from the time said isolated distributed recorder commenced storing operations.

26. The system of claims 20, 21, 22, or 23 wherein said encoded seismic signal is generated by at least one controlled vibration means.

27. The system of claims 20, 21, 22, or 23 wherein said encoded seismic signal is generated by at least one impulsive means.

28. A system for initiating data storage at an isolated distributed recorder, including:
(a) a source of an encoded acoustic signal; and
an isolated distributed recorder for detecting said encoded acoustic signal, said isolated distributed recorder including:
means for correlating said encoded acoustic signal with a preselected correlating signal;
means for causing said isolated distributed recorder to store said encoded acoustic signal and incoming seismic data, including waveforms which were generated by said source at the time said source generated said encoded acoustic signal, upon correlation between said correlating signal and said encoded acoustic signal; and p2 means for referencing the time of arrival at said isolated recorded of said encoded acoustic signal and said incoming seismic data, inclding said waveforms to the time said encoded acoustic signal, said incoming seismic data, and said waveform were generated by said source.

29. The system of claim 28 wherein said encoded acoustic signal is an encoded seismic signal.

30. A system for initiating data storage at an isolated distributed recorder, including:
(a) a source of an encoded seismic signal capable of penetrating to and refracting from a sub-surface refractive horizon; and
an isolated distributed recorder for detecting a refraction of said encoded seismic signal, said isolated distributed recorder including; p1 means for correlating said refracted seismic singal with a preselected correlating singal;
means for causing said isolated distributed recorder to store said refracted seismic signal and incoming seismic data, including waveforms which were generated by said source at the time said source generated said encoded seismic signal, upon correlation between said correlating signal and said refracted seismic signal; and
means for referencing the time of arrival at said isolated distributed recorder of said refracted seismic signal and said incoming seismic data, including said waveforms, to the time said encoded seismic signal, said incoming seismic data, and said waveforms were generated by said source.

31. A system for initiating data storage at an isolated distributed recorder, including:
(a) a source of an encoded seismic signal capable of penetrating to and reflecting from a sub-surface reflective horizon; and
(b) an isolated distributed recorder for detecting a reflection of said encoded seismic signal, said isolated distributed recorder including:
means for correlating said reflected seismic signal with a preselected correlating signal;
means for causing said isolated distributed recorder to store said reflected seismic signal and incoming seismic data, including waveforms which were generated by said source at the time said source generated said encoded seismic signal, upon correlation between said correlating signal and said reflected seismic signal; and
means for referencing the time of arrival at said isolated distributed recorder of said reflected seismic signal and said incoming seismic data, including said waveforms, to the time said encoded seismic signal, said incoming seismic data, and said waveforms were generated by said source.

32. The system of claims 28, 29, 30, or 31, further including:
means for terminating the storing of incoming seismic data after a predetermined time interval has elasped from the time said isolated distributed recorder commenced storing operations.

33. The system of claims 28, 29, 30, or 31 wherein said encoded seismic signal is generated by a least one controlled vibration means.

34. The system of claims 28, 29, 30,, or 31 wherein said encoded seismic signal is generated by at least one impulsive means.

35. The method of claims 1, 3, 10, 14, or 15, further comprising:
transmitting additional seismic data and receiving, storing, and time referencing said additional seismic data to the time said additional seismic data were generated at said isolated distributed recorder.

* * * * *